SELF-CALIBRATING FREQUENCY DISCRIMINATOR CIRCUIT

Filed Dec. 20, 1962 2 Sheets-Sheet 1

INVENTOR.
ROBERT W. LANDEE
BY Moody and Phillips
ATTORNEYS

May 5, 1970 R. W. LANDEE 3,510,769

SELF-CALIBRATING FREQUENCY DISCRIMINATOR CIRCUIT

Filed Dec. 20, 1962 2 Sheets-Sheet 2

INVENTOR.
ROBERT W. LANDEE

BY Moody and Phillips
ATTORNEYS 3,510,769
SELF-CALIBRATING FREQUENCY DISCRIMINATOR CIRCUIT Robert W. Landee, 5107 Woodley,
Encino, Calif. 91316

Filed Dec. 20, 1962, Ser. No. 249,106
(Filed under Rule 47(b) and 35 U.S.C. 118)
Int. Cl. G01r *23/12;* H03d *3/02*
U.S. Cl. 324—82 4 Claims This invention relates, generally, to frequency discriminators and, more particularly, to a highly sensitive automatically self-calibrating frequency discriminator.

Some electronic gear require frequency discriminators having more than usual sensitivity and accuracy. For example, such highly sensitive and accurate frequency discriminators find use in gear constructed to transmit and receive high-speed, high-capacity data information. For example, one type of data handling equipment encodes information in a time-synchronous manner on a tone signal, with the phase of the tone determining the character of the information contained. In "time-synchronous" encoding each bit of information is carried on the tone signal during a centain inteval of time, said time interval being equal to the time intervals allotted to all the other bits of information, and with all said time intervals occurring consecutively. With such a manner of encoding information it is possible to encode two, three, or four different channels of information on a single tone. The phase of the tone during any given time interval with respect to some reference phase, such as the phase of the preceding bit, determines the information contained in each of the channels encoded on the tone during that particular time interval. Further, it is possible to transmit several tones simultaneously, each tone containing several channels of information. At the receiver the tones are separated from each other by filtering means. It is necessary that the frequency of the tones must be unchanged when they reach the receiver. However, in certain applications, such as airborne equipment, frequency error occurs due to the Doppler effect created by the relative motion between the transmitter and the receiver. To correct for such error, a highly sensitive and accurate frequency discriminator means is sometimes employed.

An object of the present invention is to provide a highly sensitive and accurate frequency discriminator.

A second aim of the invention is to provide a sensitive and accurate frequency discriminator capable of self calibration.

A third object of the invention is a reliable, self-calibrating frequency discriminator.

A fourth aim of the invention is the improvvement of frequency discriminators, generally.

In accordance with the invention, there is provided a mechanical resonator and a resolver which have their input leads connected to a common input terminal and their output leads separately connected to the two input leads of a phase detector. The mechanical resonator is constructed to be tuned to an expected frequency component of the received signal which is supplied to said common input terminal. At its center frequency the mechanical resonator has zero degree phase shift. However, a mechanical resonator, which is a high Q device, will have a rather large rate of change of phase with respect to frequency near its resonant center frequency, whereas the resolver exhibits only a relatively small change of phase with respect to frequency. Such characteristics provide large phase differentials with small frequency changes of the signals supplied to the phase detector from the resolver and the mechanical resonator.

For calibrating purposes there is provided a calibrating frequency standard and a first switching means for disconnecting the received signal from the common input terminal and connecting the standard frequency source to said common input terminal. Also provided is a feedback circuit including a servo motor and second switching means for disconnecting the output terminal of the phase detector from the utilization means and connecting said output terminal to said feedback circuit. The servo motor is constructed to respond to the phase detector output signal to tune the resolver of the frequency discriminator so that the output signal of the phase detector approaches zero. Since the most efficient phase detectors produce a zero output when the phases of the two signals being compared are 90° apart, the resolver ordinarily will be tuned so that it will produce a 90° shift in phase of the applied calibrating signal with respect to the phase of the output signal of the mechanical resonator.

In accordance with one form of the invention, the resolver network can be replaced with a fixed 90° phase shift circuit with the result that the feedback circuit, including the servo motor, would not be required. However, in such embodiment, automatic tuning of the frequency discriminator is not possible and must be done manually.

In accordance with another modification of the invention, the resonator can be electrical rather than mechanical.

The above-mentioned and other objects and features of the invention will become more fully understood from the following detailed description thereof when read in conjunction with the drawings in which.

Figure 1:
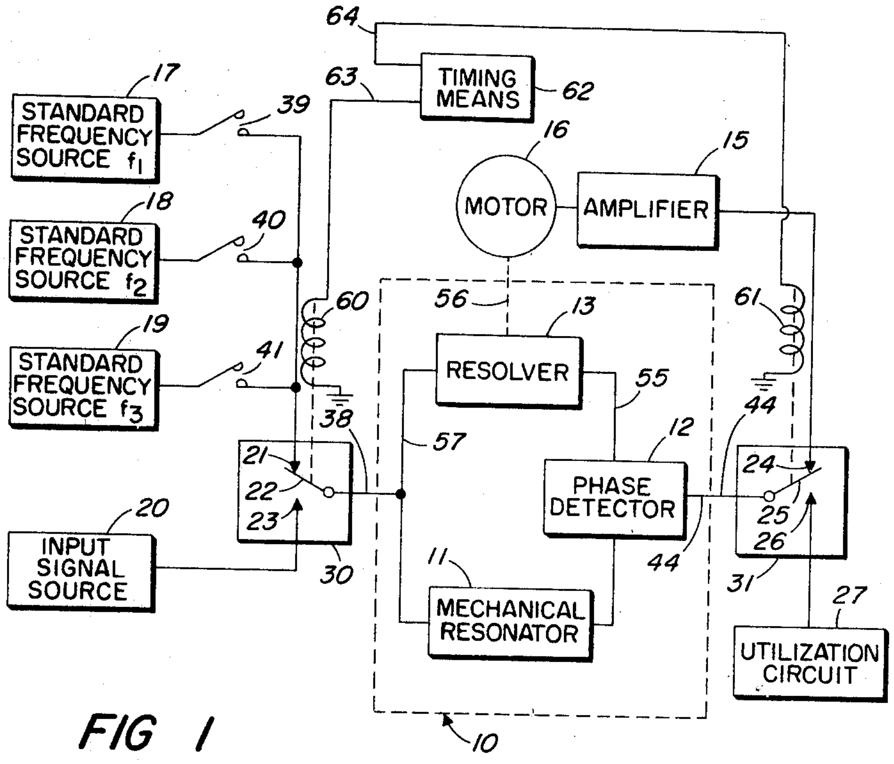
FIG. 1 shows a combination block diagram and schematic diagram of the invention.

Referring now to FIG. 1, the circuit means in block 10, including resolver 13, mechanical resonator 11, and phase detector 12, comprise the actual frequency discriminator circuit. The amplifier 15, the motor 16, and the calibrating frequency sources 17, 18, and 19 function as the calibrating portion of the circuit. More specifically, amplifier 15 is responsive to the output of phase detector 12 when armature 25 makes with contact 24 of switch 31, operable by relay winding 61, to energize the servo motor 16 which, in turn, drives resolver 13 until the output of the phase detector 12 is zero.

The input to frequency discriminator 10 is supplied to the armature 22 of switch 30, which is operated by relay winding 60 to connect either to the input source 20 or a calibrating frequency source 17, 18, or 19. Under normal operating conditions, the armature 22 makes with contact 23 so that the input signal from source 20 is supplied to the input terminal 38 of frequency discriminator 10. Also, during normal operation, the armature 25 of switch 31 makes with contact 26 to supply the output of phase detector 12 to a suitable utilization means 27.

Periodically, frequency discriminator circuit 10 is calibrated by simultaneously switching the armatures 22 and 25 of switches 30 and 31 to make with contacts 21 and 24, respectively. Also, at this time, one of the calibrating frequencies from sources 17, 18, or 19 is supplied to discriminator 10 by closing one of the contact sets 39, 40, or 41. Assume, for discussion purposes, that switch 40 is closed. Thus, a signal of frequency $f_2$ from standard frequency source 18 is supplied to discriminator 10. If an output signal is generated by phase detector 12 under such circumstances, the feedback loop including amplifier 15 and servo motor 16 will drive the resolver 13 until such error signal is nulled out. Energization of relay windings 60 and 61 is controlled by properly synchronized energizing signals supplied from timing means 62.

Figure 2:
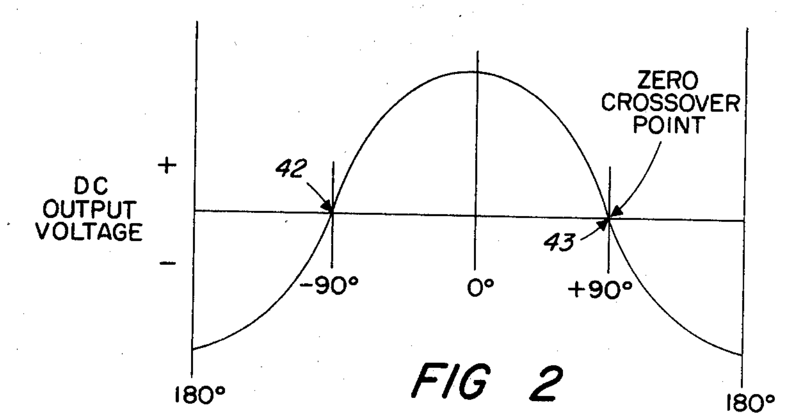
FIG. 2 shows the operating characteristic of the phase detector.
Figure 3:
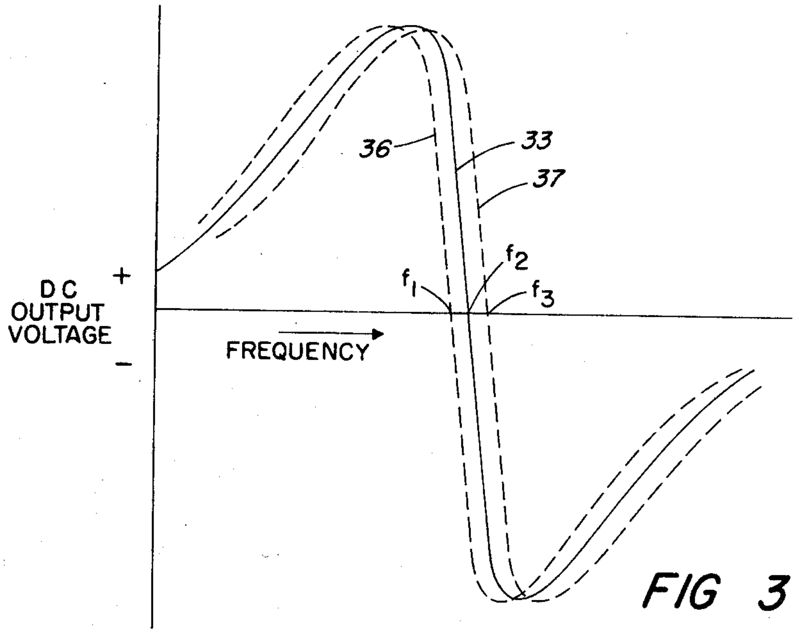
FIG. 3 shows the frequency response characteristic of the overall frequency discriminator circuit.

As stated hereinbefore, resonator 11 preferably is a high Q mechanical resonator, with a zero phase shift at the center tuned frequency. Thus, if resolver 13 produces a 90° phase shift in the applied signal at the resonator center frequency, the input signals to the phase detector 12 will be 90° out of phase. Under such conditions the phase detector will produce a zero volt output signal as indicated at the crossover points 42 and 43 shown in its characteristic curve of FIG. 2. If the frequency of the input signal supplied to the input lead 38 is either increased above or decreased below the center tuned frequency, the phase shift in the resonator 11 will no longer be zero degrees, and the input signals to the phase detector 12 will no longer be separated by 90°. Consequently, the phase detector will produce on its output lead 44 a D-C voltage whose polarity is indicative of an increase or decrease of the input signal frequency. Since the resolver 13 is, relatively speaking, not frequency sensitive, it will maintain substantially a 90° phase shift as frequency of the input signal is varied. Typical plots of the frequency characteristic of the discriminator of FIG. 1 are shown by the curves of FIG. 3. Because the phase of the output signal of the high Q mechanical resonator 11 is very sensitive to changes of frequency around its resonant center frequency, the slope of the operating portion of the characteristic curve 33 is quite steep, thus enabling very small changes in the input signal frequency to be detected by the discriminator.

It is to be noted that the frequency discriminator 10 is not always tuned to the resonant center frequency of the mechanical resonator 11. It is entirely possible, due to environmental changes, such as temperatures for example, that the resonant center frequency of the mechanical resonator will vary from the standard calibrating frequency. Under such circumstances the frequency discriminator will be calibrated to a frequency which is not the normal resonant center frequency of the mechanical resonator 11. The resolver 13 will then be driven to produce a phase shift which may not be an absolute 90°, but will be such that the phase difference between the output signals of the resonator and the resolver will be 90°.

It is possible to calibrate the frequency dicriminator 10 to different standard frequencies as long as the difference between the standard calibrating frequencies is not too large. The reason for such a limitation in calibration frequency range is apparent when the high Q characteristic of a mechanical resonator 11 is considered. If the calibrating frequency is too far removed from the center resonant frequency of the mechanical resonator, then little or no resonance will be obtained in the mechanical resonator. However, inside the allowable frequency limits, more than one standard calibrating frequency may be employed. For example, in FIG. 3, the characteristic curves for three standard calibrating frequencies are shown, with the dotted curves 36 and 37 representing standard calibrating frequencies $f_1$ and $f_3$, generated in blocks 17 and 19 of FIG. 1, which are below and above, respectively, the standard calibrating frequency $f_2$ generated in the block 18. In the case where the calibrating frequency is different from the center frequency of the mechanical resonator 11, the motor 16 will drive the resolver 13 until a 90° phase difference exists between the resolver 13 output and the mechanical resonator 11 output.

Returning again to the normal calibration function, the motor 16 will drive the resolver 13 until the D-C output signal of the phase detector 12 is zero, thus completing the calibration of the frequency discriminator 10. Upon completion of calibration, the armatures 22 and 25 are switched to make contact with contacts 23 and 26 of switches 30 and 31, respectively, to return the frequency discriminator to its normal operating condition.

The means by which the switches 30 and 31 can be actuated are matters of design and will not be discussed herein. Furthermore, even though the switches 30 and 31 are shown as electro-mechanical devices, they can in fact be electronic switching devices.

Figure 4:
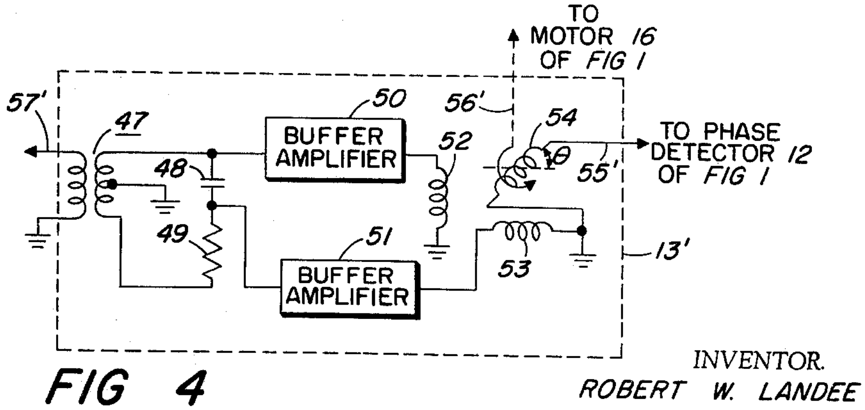
FIG. 4 shows a resolver circuit which can be employed in the invention.

Referring to FIG. 4, there is shown one form of a resolver circuit which may be used as a specific example of block 13 of FIG. 1. Both the input signal and the calibrating signal are supplied to the primary of transformer 47 through the input lead 57′ (at different times). The secondary winding of transformer 47 is center tapped to ground and has an impedance thereacross comprised of capacitor 48 and resistor 49. Across such capacitor and resistor will appear voltages whose phases are 90° apart. The voltage across capacitor 48 and resistor 49 are supplied to buffer amplifiers 50 and 51, respectively, and then to resolver stator windings 52 and 53, respectively. Since the resolver stator windings 52 and 53 are positioned in space quadrature and, further, since the phases of the voltages thereacross are time phased apart by 90°, there is produced a rotating vector field through the rotor winding 54. Consequently, a voltage having any desired phase relationship with the phase of the input signal supplied to transformer 47 can be induced in the rotor winding 54 with the phase relationship being designated by the angle $\theta$. The voltage generated in the resolver rotor winding 54 is supplied via output lead 55′ to the phase detector 12 of FIG. 1. A mechanical linkage 56′ connects the rotor winding 54 to the servo motor 16 of FIG. 1, as shown in FIG. 1.

Figure 5:
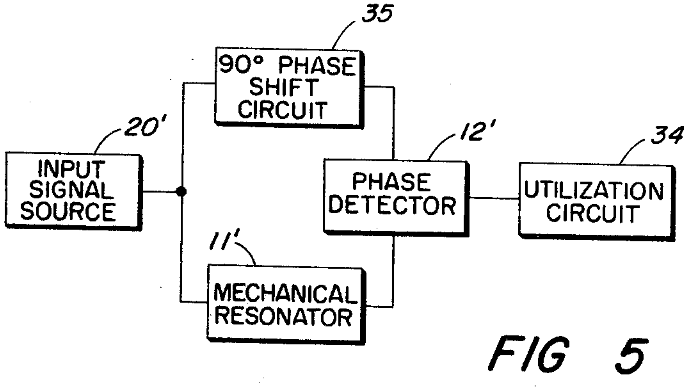
FIG. 5 shows a block diagram of a form of the invention without the self-calibrating feature.

Referring to FIG. 5, there is shown a more general form of the invention in which the automatic calibrating feature has been omitted. In place of the resolver 13 of FIG. 1, there has been substituted a constant 90° phase shift. Thus, when the frequency of the input signal source 20′ is equal to the resonant center frequency of the mechanical resonator 11′, the output of the phase detector 12′ will be zero, since there is a 90° phase difference between the output signals of the phase shift circuit 35 and the mechanical resonator 11′. If, however, the frequency of the input signal source 20′ should vary from the resonant center frequency of the mechanical resonator 11′, the phase relationship between the output signals of the phase shift circuit 35 and the mechanical resonator 11′ will vary from 90° whereby a D-C output signal will be produced by the phase detector 12′, the polarity thereof being indicative of an increase or decrease in the change of the frequency of the input signal 20′. The phase shift circuit 35 should be constructed to be manually adjustable.

It is to be understood that the forms of the invention shown and described herein are but preferred embodiments thereof and that various changes may be made in circuit arrangements without departing from the spirit or scope of the invention.

I claim:

1. Frequency discriminator means for detecting frequency variations from a predetermined value of a signal from an input signal source, said frequency discriminator comprising:

resonator means having a center tuned frequency and a phase shifting means;

said resonator means and said phase shifting means having common input terminal means connected to the output of said input signal source;

phase detector means constructed to respond to the output signals of said phase shifting means and said resonator means to produce an output signal indicative of the direction and amount of deviation of the input signal frequency from the center tuned frequency of said resonator means;

servo means having an input terminal and constructed to be responsive to the output of said phase detector means to adjust said phase shifting means until the output signal of said phase detector means attains a predetermined value;

first switching means for connecting the output terminal of said phase detector means to the input terminal of said servo means to enable adjustment of said phase shifting means;

calibrating signal source means for calibrating said frequency discriminator means to a desired center tuned frequency;

second switching means for periodically connecting said calibrating signal source means to said common input terminal means;

and timing means for causing said first and second switching means to connect the output terminal of said phase detector means to said servo means during the time that said calibrating signal source means is connected to said common input terminal means.

2. Frequency discriminator means in accordance with claim 1 in which said resonator means comprises a mechanical resonator.

3. Frequency discriminator means for detecting frequency variations from a predetermined value of a signal from an input signal source, said frequency discriminator comprising:

resonator means having a center tuned frequency and a phase shifting means, said resonator means and said phase shifting means having common input terminal means connected to the output of said input signal source;

phase detector means constructed to respond to the output signal of said phase shifting means and said resonator means to produce an output signal indicative of the direction and amount of deviation of the input signal from the center tuned frequency of said resonator means;

servo means having an input terminal and constructed to be responsive to the output of said phase detector means to adjust said phase shifting means until the output signal of said phase detector means attains a predetermined value;

calibrating signal source means for calibrating said frequency discriminator means to a desired center tuned frequency;

switching means for substantially simultaneously connecting said calibrating signal source means to said common input terminal means and for connecting the output terminal of said phase detector means to said servo means.

4. Frequency discriminator means in accordance with claim 3 in which said resonator means comprises a mechanical resonator.

References Cited

UNITED STATES PATENTS

| | | | |
|---|---|---|---|
| 2,964,703 | 12/1960 | Sargent et al. | 324—83 |
| 2,343,633 | 3/1944 | Baldwin | 324—80 XR |
| 2,888,558 | 5/1959 | Gilman | 329—118 |
| 2,698,410 | 12/1954 | Madsen et al. | 329—112 |
| 3,083,336 | 3/1963 | Poirier | 329—112 |

RODNEY D. BENNETT, Jr., Primary Examiner

C. E. WANDS, Assistant Examiner

U.S. Cl. X.R.

329—112, 118